United States Patent [19]

Bajgert et al.

[11] Patent Number: 4,714,946
[45] Date of Patent: Dec. 22, 1987

[54] CONTINUOUS FORM FEEDER FOR A REPRODUCING MACHINE AND PROCESS

[75] Inventors: Teddy A. Bajgert, Boulder; Neall H. Bunker; James L. Cochran, both of Longmont; Willis J. Duane; Arturo Mojica, both of Boulder, all of Colo.

[73] Assignee: International Business Machines Corporation, Armonk, N.Y.

[21] Appl. No.: 802,648

[22] Filed: Nov. 27, 1985

[51] Int. Cl.⁴ .................................................. G03B 27/62
[52] U.S. Cl. ................................... 355/75; 355/14 SH
[58] Field of Search ............... 355/14 SH, 50, 51, 25, 355/75

[56] References Cited

U.S. PATENT DOCUMENTS 4,240,744 12/1980 Rapp et al. ............................. 355/75
4,300,710 11/1981 Dubois et al. .................. 355/14 SH
4,433,909 2/1984 Center et al. .......................... 355/75
4,485,949 12/1984 Gebhart et al. ................ 355/14 SH Primary Examiner—Monroe H. Hayes
Attorney, Agent, or Firm—Perman & Green

[57] ABSTRACT

A multipurpose document feeder, reproducing machine employing a document feeder, the process for operating the document feeder being adapted to copy in either a continuous form feeding mode of operation or an alternative document feeding mode of operation such as semi automatic document feeding. The continuous web support system when moved to its operative position automatically conditions the feeder and reproducing machine to copy in the continuous web mode of operation. An idling pin wheel which engages holes in the web edge is utilized to control incremental feeding of the web during copying and also for sensing jams or tears in the web.

55 Claims, 14 Drawing Figures

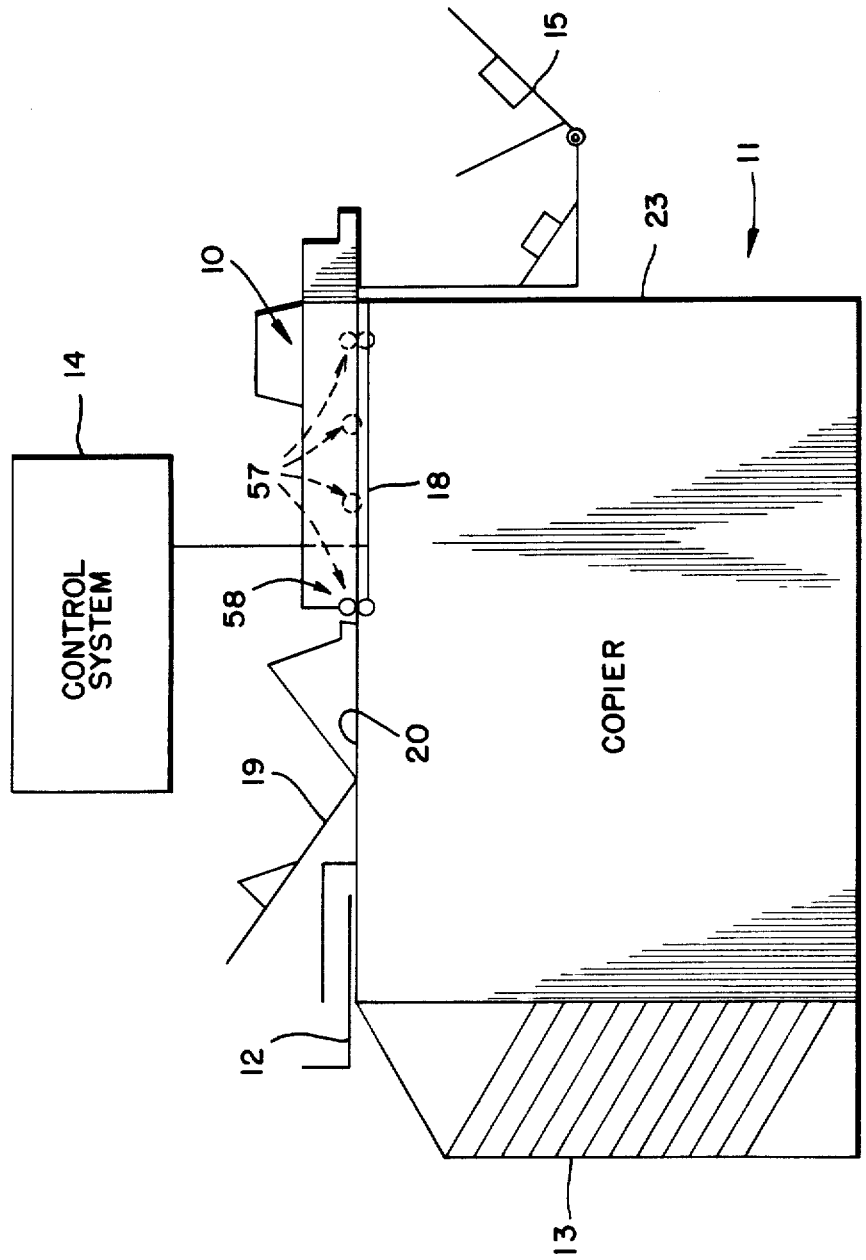

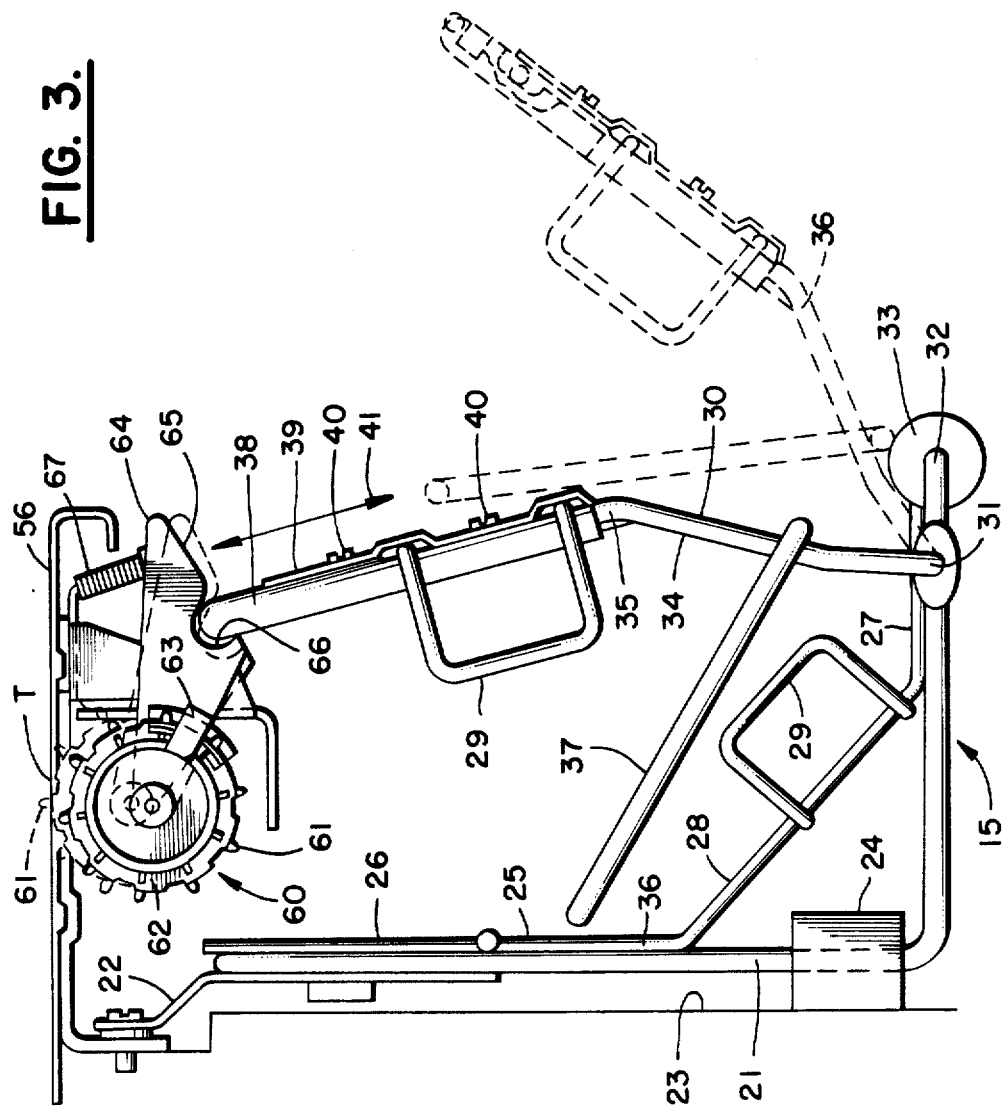

CONTINUOUS FORM FEEDER FOR A REPRODUCING MACHINE AND PROCESS

FIELD OF THE INVENTION

This invention relates to a continuous form feeder which is adapted for use with a reproducing machine capable of forming copies of a continuous form document incrementally fed relative to the machine. The reproducing machine includes a system for viewing a document and forming an image thereof on a desired copy substrate. The continuous form feeder includes a multi-purpose document feeder which is selectively operable in a number of modes including continuous form feeding and at least one other mode such as semi-automatic document feeding or recirculating document feeding.

BACKGROUND OF THE INVENTION

The use of continuous form feeders is clearly exemplified by the feeders set forth in U.S. Pat. Nos. 3,997,093; 4,087,172; 4,313,672; 4,334,764; 4,485,949; and 4,488,670. U.S. Pat. No. 3,997,093 shows the use of indicia for pre-aligning the leading edge of a continuous form web to provide proper registration during feeding. It also shows a button for setting the size of the form to be advanced. The continuous form feeder of this patent utilizes a shaft encoder comprising an optical beam splitter disk to sense the amount of continuous web being fed. It also discloses a shaft having a slot which operates as a beam splitter and motion sensor to sense jams.

U.S. Pat. No. 4,087,172 discloses a control panel wherein the length of the web to be advanced can be pre-selected in units of half inches and wherein the controller uses a pulse scanning device with one pulse per half inch increments for determining the web feed length for the feeder. U.S. Pat. No. 4,313,672 discloses a rapid advance operation as well as wheels for setting the form length and the use of lead edge feeding indicia. U.S. Pat. No. 4,334,764, discloses a removable continuous form feeder.

U.S. Pat. No. 4,485,949 is directed to a multi-purpose document feeder which has the capability for semi-automatic document handling or form feeding and in which the selection of one inhibits the other. This patent discloses in its background portion a large body of relevant prior art which is intended to be incorporated by reference herein. Other examples of multi-purpose document feeders include the Xerox 3100LDC Machine with a continuous form capability.

The aforementioned U.S. Pat. No. 4,485,949 also discloses counting holes to determine form feeding distance. Further, this patent discloses a feedback to stop the web at the right position registered on the viewing port. The feeder of this system uses a count encoder which counts pulses after sensing a hole to provide continued movement until a desired count is reached and the document properly registered. U.S. Pat. No. 4,448,670 discloses the use of a slow initial web feeding speed to allow manual restacking of the web. These patents also include further disclosures of interest in respect to the present invention.

U.S. Pat. No. 3,914,677 is of interest in that it discloses a paper advancing system wherein movement of a sprocket wheel is sensed by means of a light sensitive device.

It is an aim of this invention to provide a multipurpose document feeder adapted for use in conjunction with a reproducing machine such as a copier.

A further aim of this invention to provide a multipurpose feeder as above which is adapted to selectively feed individual sheets in one mode of operation or a continuous form document in another mode of operation.

It is a still further aim of this invention to provide a copier employing a multipurpose document feeder as above.

It is a still further aim of this invention to provide a process for operating a reproducing machine employing a multipurpose document feeder as above It is yet a further aim of this invention to provide input and output continuous form document support structures for providing an improved feeding and re-stacking of fan fold continuous web document.

These and other aims will become more apparent from the following description and drawings.

SUMMARY OF THE INVENTION

In accordance with this invention a multi-purpose document feeder is provided which is adapted in one mode to feed a continuous form document such as a computer fan fold and in an alternative mode to feed a document semi-automatically, automatically or in a recirculating fashion. If desired there may be more than one alternative mode of operation besides the continuous form feeding mode. In the continuous form mode, the multipurpose document feeder drives continuous, hole punched forms across the document glass or platen of the reproducing machine.

In accordance with the invention, the control system counts the form feed holes and stops the feeder in such a manner as to position the form segment correctly on the document glass. It is a highly unique aspect for the present invention that the continuous form feed mode of operation is selected when the input support rack for the continuous form document is moved from its stored position to its operative position. This movement automatically places the reproducing machine in the form feeder mode of operation. In this condition a pin wheel moves up into the plane of the feeder document entry tray. The pin wheel is tied to the control system to count the advancement of the form and thereby provide movement of the form one panel at a time to the platen of the reproducing machine. Indicia on the document entry tray enable the operator to measure the size of the form to be copied and to set a document size on the feeder so that the control system can compare the number of sensed form holes to the pre-selected number on the dial in order to move the web one panel length.

The control system is also adapted to stop the reproducing operation after the first few panels have been copied. This enables the operator to insure that form stacking in the exit bin is taking place properly. Copying is then restarted by pushing the start button.

Upon entering the continuous mode of operation the control system also inhibits the other document feeding modes of operation such as semi-automatic and automatic document feeding. It also inhibits the job interrupt function and selects the collating mode of operation for the reproducing machine.

The operator may begin the continuous form mode of operation by pressing the reproducing machine start button or the forms may be advanced to a point anywhere in the fan fold stack to be copied. This is accomplished by means of a rapid form advance function which advances the web through the feeder at high speed without copying. Thereafter, upon pressing the start button, the reproducing machine will begin copying web segments as the document feeder incrementally advances them to the machine's platen. The web is preferably driven by the document feeder exit drive rollers so that the feeder can be adapted for multi-mode operation.

The control system is also provided with logic to manage the copying of the last few web segments after the form has disengaged from the pin wheel. The control system stops the copying operation so that the operater must raise the document feeder cover to insure proper registration of the last web segments. The feeding of the final web segments is provided using a predetermined time duration since the pin wheel is now disengaged.

The input stack support tray has a unique arcuate construction and bale bar arrangement for providing jam free feeding of the web. The exit tray for the web is adapted to seat in the normal document feeder output tray and includes a unique arrangement wherein the document is driven upwardly and then downwardly into the tray which is vertically inclined to properly stack the documents of varying form segment lengths.

In accordance with this invention, a multipurpose document feeder for a reproducing machine and a reproducing machine employing such a document feeder and a process for operating the machine are provided. The reproducing machine includes means for viewing a document and for forming the image thereof on a desired copy substrate. The multi-purpose document feeder comprises document feeding means selectively operable in a first mode wherein one or more individual document sheets are serially fed to the viewing means or in a second mode wherein the document comprises a continuous web which is incrementally advanced over the viewing means.

A continuous web supporting means is arranged adjacent the document feeding means supporting a fan folded stack of the web. The continuous web is divided into a plurality of web sections which are arranged in a fan folded arrangement. The web includes spaced apart holes extending longitudinally along at least one edge thereof. Means are provided for supporting the web support means for movement selectively between a first stored position corresponding to the first mode of document feeder operation and a second operative position corresponding to a second web feeding mode of operation. When the support means is in its stored position it does not interfere with operation of the document feeder. When the support means is in its second position, it is operative to support the web for feeding by the feeding means to the viewing means. A control means is provided which is responsive to the movement of the web supporting means between the respective first and second positions to automatically condition the feeding means to operate in its corresponding first or second modes of operation.

Preferably, the document feeder includes a pin wheel arranged for rotation which has a plurality of pins extending radially outwardly therefrom. The spacing of the pins is selected so that they can mate with the holes of the web. Means are provided for supporting the pin wheel selectively in a first start position where it will not intercept a web or other document in the document feeder or in a second operative position wherein at least one of the pins mates with at least one of the web holes so that movement of the web causes a corresponding movement of the pin wheel. Means are provided for positioning the pin wheel in its first position responsive to the web supporting means being moved to its first position and for positioning the pin wheel in its second position responsive to the web supporting means being moved to the second position.

In accordance with a preferred embodiment, a manually operative override means is provided to move the pin wheel from its second position to its first position to facilitate insertion or removal of the web from the feeder.

The web support means preferably comprises an input wire form basket for supporting the stack in an arcuate arrangement. The basket includes a bale bar in the bottom of the bin which includes hinges at a intermediate point to allow the operator to fold the bin into its stored position. The bale bar also facilitates the smooth transition from stack to web.

The output tray also comprises a wire form rack or basket. The output tray includes means along its edge adjacent the feeder for removeably attaching the tray to the feeder. The output tray includes a gate which is movably supported to allow removal of forms from the tray. When not in use, the tray attaches to the bottom of the input tray for storage.

The control system preferably includes an encoder means associated with the pin wheel for generating a first control signal corresponding to a degree of movement of the pin wheel. The manual selector means has a plurality of settings corresponding to web section length and is adapted to generate a second control signal corresponding to a desired incremental web feeding length. Means are provided for comparing the first and second signals for controlling the incremental feeding length of the web by the multipurpose document feeder in the web feeding mode of operation.

Another aspect of the present invention comprises providing a measuring member on the feeder input tray having indicia corresponding to a plurality of different web section lengths. The indicia also correspond to appropriate settings for the manual selector means. The web is positioned at the measuring member so the appropriate setting of the manual selector means can be determined.

The pin wheel and encoder means are also adapted for sensing web jams and tears.

Preferably, the encoder generates a first signal comprising a plurality of pulses with each pulse corresponding to a given fraction of the desired incremental web feeding length and the comparing means includes means for counting the pulses for comparing the number of pulses to a desired number set by the selector means. The control system also includes means for generating a third signal when the desired number of pulses are counted for controlling the feeding means to stop the web with a desired web section properly registered over the viewing means.

Preferably, the control system also includes means responsive to the viewing means, completing the viewing and imaging of the desired web section for initiating the feeding means to feed the next section to the viewing means.

Preferably, the control system also includes means for sensing an upstream end of the web, means responsive to the end sensing means for interrupting the feeding means for a desired time, with at least one desired incremental web length remaining to be fed over the viewing means and means operative following the desired time for causing the feeding means to feed the web for a predetermined period of time to feed at least one remaining web section to the viewing means even if the pin wheel is no longer operatively engaged to the web. If desired a plurality of such feeding sequences corresponding to the number of incremental web lengths remaining can be provided. The feeder includes a cover portion arranged for movement away from the viewing means between respective closed or open positions. Preferably, the means for feeding the web a predetermined period of time is operative responsive to the movement of the cover portion from its open position to its closed position after the web has been checked for proper registration.

In accordance with another aspect of this invention, the control means includes means including the pin wheel and encoder for sensing the feeding of a given number of incremental web feeds and means responsive to the sensing of said given number of incremental web feeds for interrupting the feeding of the web by the feeding means to permit the proper restacking of the web exiting the feeding means and means for restarting the feeding means after such an interruption. Preferably, the control means includes means for selectively operating the feeder to rapidly advance the web to position a desired web section over the viewing means.

Preferably, the control system is adapted upon movement of the input tray to its operative position to inhibit the document feeder from operating in its first mode of operation.

The invention also includes a multipurpose reproducing machine comprising means for viewing a document for forming an image thereof on a desired copy substrate, means for selectively collecting said image substrates in an output tray or a collator, respectively, document feeding means for feeding documents to the viewing means and control means for controlling the operation of the respective viewing and image means, output collector means, and document feeding means. The document feeding means comprises the multipurpose document feeder as previously described. In accordance with this embodiment of the invention, the control means comprises the reproducing machine control means and is further adapted upon movement of the document support tray to its operative position to inhibit the job interrupt function of the reproducing machine and to condition the copier for the collating mode of operation. The control system of the copier also activates an image erase means when the manual selector means is set to a size which is smaller than the size of the copy substrate.

The process for operating a reproducing machine such as a copier including a multipurpose feeder as above described also forms part of this invention.

BRIEF DESCRIPTION OF THE DRAWINGS

FIG. 2 is a schematic front view of the reproducing machine of FIG. 1.

FIG. 3 is a schematic side view of the continuous bulk stack input support tray and the continuous feed sensing system.

DETAILED DESCRIPTION

Figure 1:
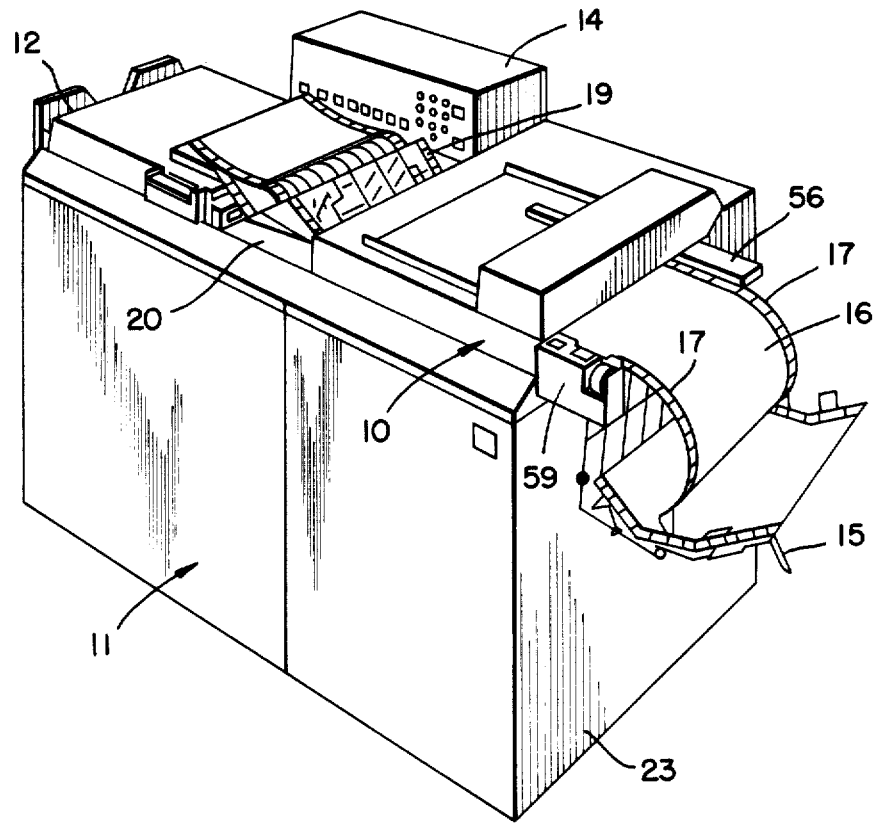
FIG. 1 is a schematic perspective view of a reproducing machine having a multipurpose document feeder in accordance with this invention.

Referring now to FIGS. 1 & 2, a multipurpose document feeder 10 is shown which is adapted to be an optional attachment to a reproducing machine such as a IBM Series III, Model 60 Copier. The document feeder 10 allows the operator to quickly and automatically copy strip like documents such as computer generated continuous forms and the like without having to separate the document into individual sheets, panels or sections. Such forms generally comprise individual page sections, such as 8½×11 inch panels, in a continuous web format presented as a fan fold stack. The web includes perforations for separation of the panels, if desired, and feed holes equally spaced along the entire length of both edges. The multipurpose feeder 10 of this invention provides the reproducing machine 11 with the capability of automatically copying such continuous hole punched forms such as computer printouts or similar fan folded items.

The reproducing machine 11 preferably comprises a copier such as the IBM Series III, Model 60 Copier which is described in U.S. Pat. No. 3,897,148. The copier 11 includes means for viewing a document and for forming an image thereof on a desired copy substrate (not shown) such as cut sheet paper. The copier 11 includes means for selectively collecting the image of substrates in a output tray 12 or a collator 13, respectively. The copier 11 also includes control means 14 for controlling the operation of the respective viewing and imaging means, the output collecting means and the document feeding means.

The multipurpose document feeder further includes an entry wire form web stack support bin 15 which is adapted to hold a continuous web 16 having individual segments (not shown) separated by fold, i.e. tear, perforations. The document feeder 10 of this invention in its continuous form feeding mode is adapted to automatically advance each web 16 section to the copier's platen 18 which is a component of the viewing and imaging means of the copier. The copier 11 is adapted to make as many copies of each web section as desired and then advance to the next web section where the process is repeated. If a collator 13 is provided with the copier 11, a number of collated sets can be made with each set consisting of all web sections in the continuous form 16.

The document feeder 10 also includes a wire form output document web stack supporting bin 19. The bin 19 is adapted to fit over the normal document output tray 20. The mechanical arrangement of the output bin 19 has been selected to insure that all of the various web section sizes will stack properly after being copied.

The multipurpose document feeder 10 is selectively operable in at least one first mode wherein one or more individual document sheets may be serially fed to the viewing means or platen 18 or in a second mode wherein the document comprises a continuous web 16 which is incrementally advanced over the platen 18. The at least one first mode of operation can comprise semi-automatic document feeding, fully automatic document feeding or recirculating document feeding as desired. A document feeding arrangement for carrying out at least one first mode of operation is exemplified in U.S. Pat. No. 4,285,512.

Figure 4:
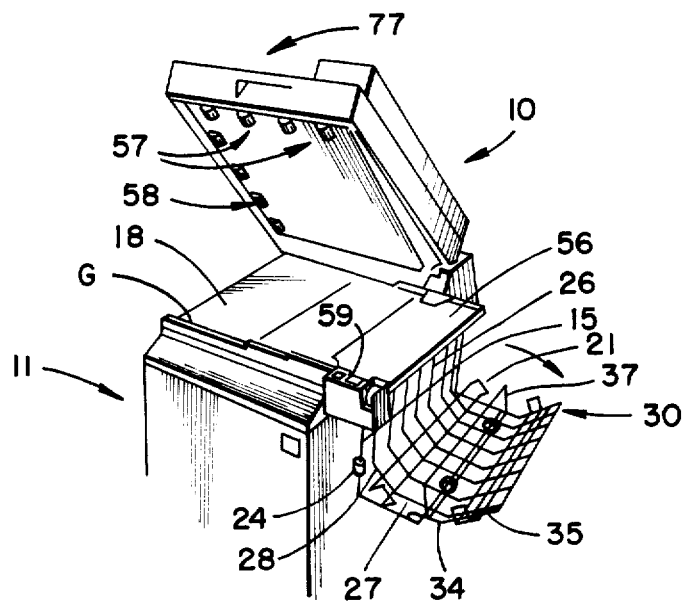
FIG. 4 is a partial perspective of the reproducing machine of FIG. 1 with the input stack support tray in its unfolded operative position.
Figure 5:
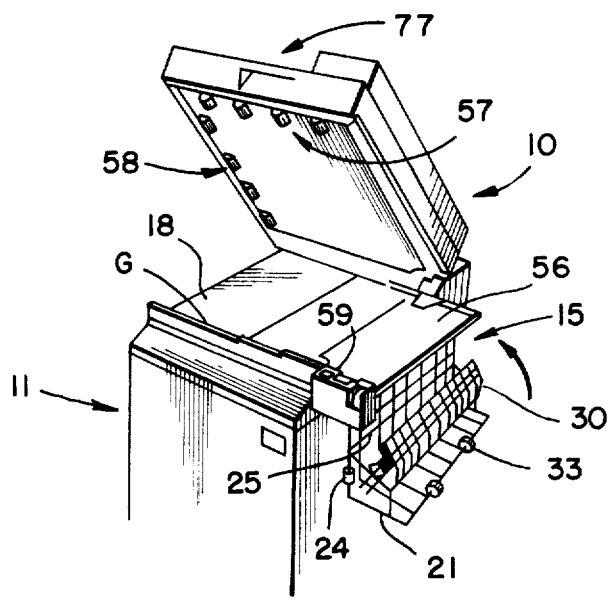
FIG. 5 is a partial perspective view of the reproducing machine of FIG. 1 with the input stack support tray in its folded inoperative position.

Referring now to FIGS. 3 through 5, further details of the input web stack support bin 15 and its operation will be described. The web stack input bin 15 comprises a foldable wire form basket. A bin support frame 21 is mounted by a bracket 22 at one end at the side 23 of the copier 11 and adjacent the document feeder 10. The lower portion of the bin frame 21 includes bumpers 24 so that as frame 21 pivots at its lower portion, the bumpers 24 engage the side 23 of the copier. The bin frame 21 supports a stationary wire form stack support portion 25. The stationary wire form portion 25 is divided into three sections. A generally vertically extending first section 26 parallels the vertical portion of the L-shaped bin frame 21. A generally horizontally extending second section 27 is connected to the vertically extending first section 25 by means of a corner or inclined third section 28. The inclined third section 28 includes U-shaped wire form tabs 29 at each end thereof.

The input bin 15 further includes a moveable portion 30 which can be selectively moved between a stored position, as shown in solid lines in FIG. 3 and as best illustrated in FIG. 5, and a operative position as shown in phantom in FIGS. 3 and 4. The moveable bin portion 30 comprises a wire form rack which is pivotally supported at one end 31 by the bin frame 15. The bin frame end 32 supports bumpers 33.

The movable bin portion 30 includes sections 34 & 35 which are inclined with respect to one another so as to form an obtuse angle whereby in its operative position, as shown in phantom, it provides a concave support surface 36 for the continuous web stack. When the bin portion 30 is pivoted to its operative position against the bumpers 33, it is held by the bumpers in a position inclined to the vertical as shown. In its operative position, the bin portion 30 and the bin portion 25 form an arcuate concave support surface 36 that operates on the web stack 16 such that curl or creases are forced out of the stack due to the stack being supported in an arcuate or generally cylindrical shape by the bin 15.

The movable bin portion 30 also includes tabs 29 which provide position indication and maximum stack height indication while allowing finger relief for manipulating the stack in the bin 15 after the stack is loaded therein. The movable bin portion 30 also includes a cross bale 37 that operates on the web 16 to automatically reduce counter creases that can occur causing foldovers and resultant jams. It further reduces feed resistance which helps in the feeding of multiple section continuous forms. The movable bin portion 30 also includes an adjustable protrusion 38. Protrusion 38 is supported on the free end of the movable bin portion 30 by means of bracket 39 and screws 40. The adjustment of the position of protusion 38 in the direction of arrow 41 is easily accomplished by loosening the screws 40 which then allow the protrusion to move up or down in the direction of arrow 41. The purpose of the protrusion 38 which will be described in greater detail later is to activate the continuous mode of operation for the document feeder 10 by actuating sensing switch 65.

In this embodiment, the input stack support bin 15 is adapted to support continuous form webs ranging in size from about 7 inches to 12 inches in length between fold perforations and from about 5 to 14⅝ inches in width which define the respective web sections.

Figure 6:
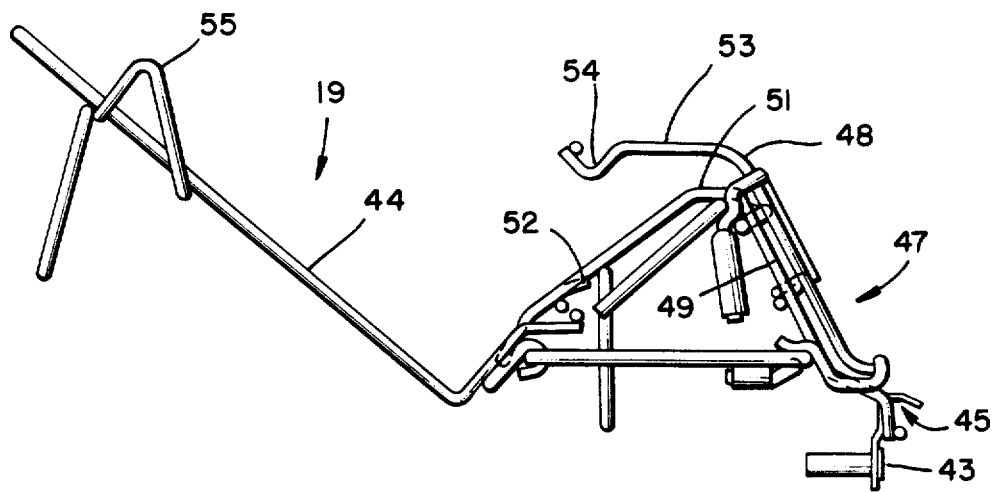
FIG. 6 is a side view of the output continuous web stack support tray.
Figure 7:
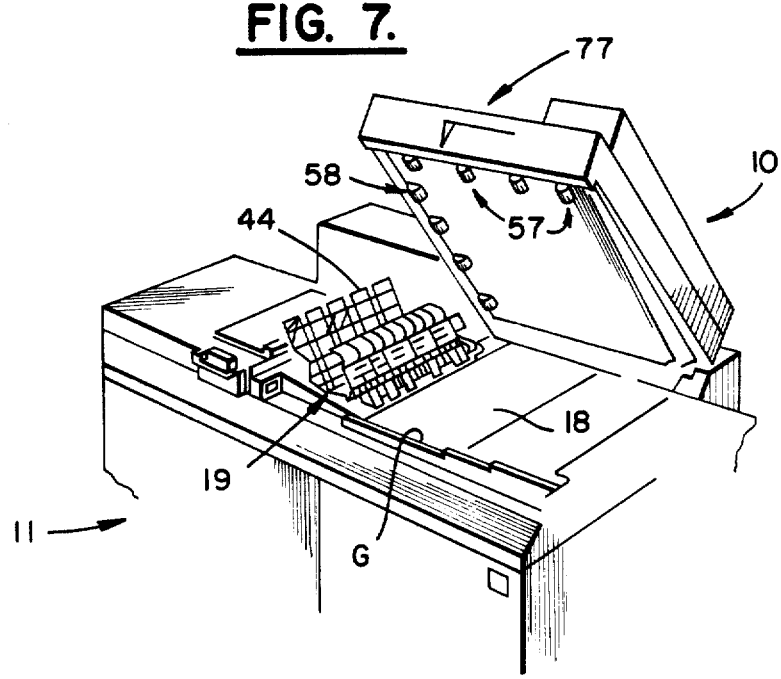
FIG. 7 is a partial perspective view of the reproducing machine of FIG. 1 with the document feeder cover open and the output stack support tray in its operative position.
Figure 8:
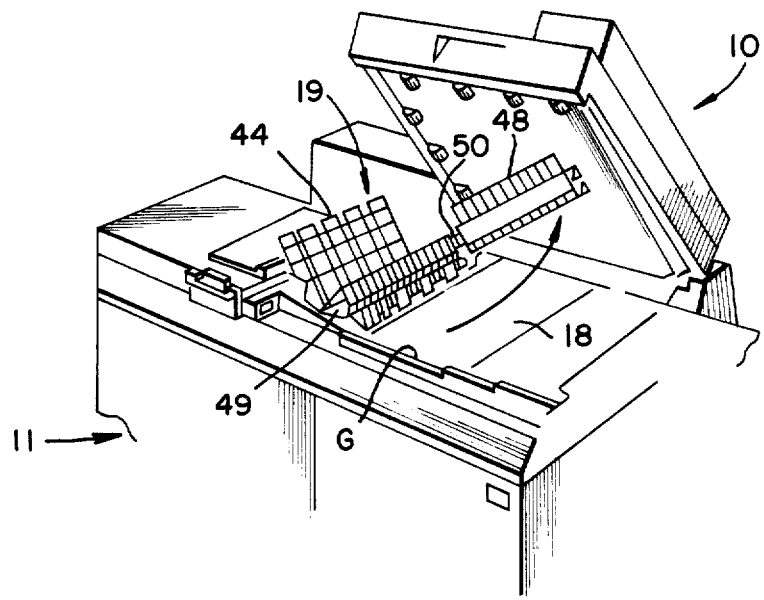
FIG. 8 is a partial perspective view of the reproducing machine of FIG. 1 with the upper document guide of the output stack support tray in its open position permitting the web to be removed from the output stack support tray.

Referring now to FIGS. 6 through 8, the document output support bin 19 will be described in greater detail. The purpose of the output stack support tray 19 is to refold the continuous form document leaving the document feeder 10 after the copying operations on the respective web sections have been completed. The output bin 19 is removably located on the copier document exit tray 20. The right side of the bin 19 contains integral magnets 43 that attach the rack under the document feeder 10 exit flap (not shown). The bin 19 is geometrically configured to stack a plurality of form sizes required for a continuous form feeder. In this embodiment, the bin 19 stacks fan fold forms 16 that are from about 7 to 12 inches between perforations 17 at a feed velocity of approximately 35 inches per second and at feed rates of at least 75 form sections or panels per minute. The continuous web can be from 5 to 14⅝ inches in width and can have a weight varying from at least 15–20 pounds (bond basis).

Figure 9:
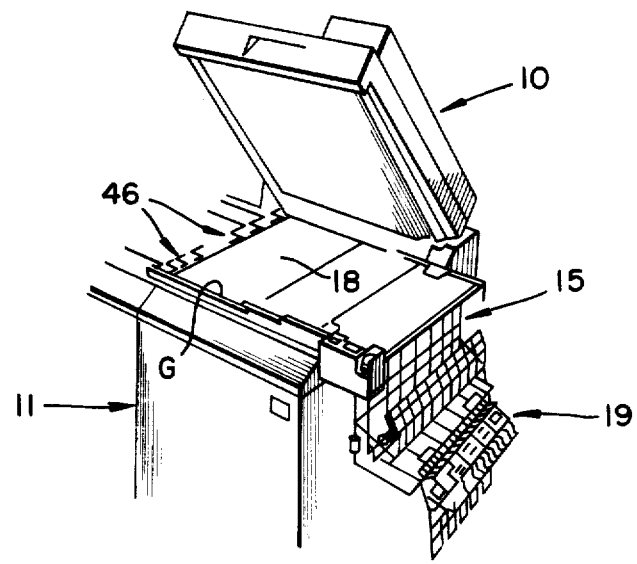
FIG. 9 is a partial perspective view of the reproducing machine of FIG. 1 with the output stack support tray in its stored position hanging from the input stack support tray.

The geometry of the exit bin 19 is unique in that the receiving tray portion 44 is above the document feeding plane defined by the platen 18. It is further unique in that it stacks at an incline of approximately from about 30 to about 60 degrees and preferably at about 40 degrees to the horizontal whereas conventional stackers are typically horizontal with a vertical entry. The output bin 19 is readily removable from the document output tray 20 and can be readily stored by hanging it off the input bin 15 as shown in FIG. 9. Removal of the output bin 19 from the output tray 20 permits access to other machine components and operation of the document feeder 10 in a non-continuous form mode of operation. The magnets 42 are used to provide ease of attachment and removal of the bin 19.

The output bin 19 includes tabs 45 on the right side adjacent to feeder 10 which slide into slots in the feeder exit flap 46. The entry portion 47 of the bin 19 is inclined vertically upward and comprises a channel defined between respective upper and lower wire form guide sections 48 & 49. The upper guide section 48 is hinged at one side 50 of the lower guide portion 49 (See FIG. 8). When the upper guide section 48 is in its closed position as in FIG. 7, the desired entry channel is formed. When the upper guide 48 is swung open from the lower guide 49 as is FIG. 8, it is possible to easily remove the web from the output bin 19. The lower guide section 49 extends horizontally in portion 51 and then downwardly in portion 52. The upper guide 48 includes a longer horizontal portion 53 than the horizontal portion 51 of the lower guide 49. The horizontal portion 53 terminates in a downwardly directed portion 54 at its free end. The downwardly directed portion 52 of the guide 49 terminates at the upwardly directed receiving tray 44 to which it is integrally connected. The output tray 44 includes tabs 55 which insure proper alignment of the web stack 16 in the tray 44.

In operation, the web exiting the document feeder 10 travels through the channel defined between the respective guides 48 & 49 and is then deflected by the depression 54 in a downwardly direction into the tray 44. The inclination of the tray 44 cooperates with the upper guide portions 53 & 54 to properly restack the web 16 in a fan-folded manner in the output tray 44. As will be described later it is desirable to stop the copying operation after the first two or three web sections have entered the tray 19 to insure that proper stacking of the web 16 in the tray 19 is being achieved.

The output bin 19 can be used with document inputs that are placed in a horizontal plane up to 90 degrees off horizontal, with horizontal inputs above or below the receiving tray 44. The output bin 19 does not require its own power source, instead it is able to operate off the feeder drives. Further, it requires no sensors or switches.

Referring again to FIGS. 1 through 5, further details of the document feeder 10 of this invention will be described. The document feeder 10 shown in the Figures comprises a semi-automatic document feeder although it could just as well be an automatic document feeder or a recirculating document feeder. In the semi-automatic document feeding mode, a sheet document is placed on the document feeder entry tray 56. For this operation, the document feeder 10 is closed as in FIG. 1. The feeder cover 10, as shown in FIGS. 4 & 5, contains drive rollers 57 which advance and align the document from the entry tray 56 onto the viewing platen 18. Suitable drives as are known in the art are provided in the document feeder cover 10 for incrementally advancing the drive rollers 57 to place the document over the platen.

After the copying cycle is completed, the document is advanced off the platen by the drive rollers 57 and by exit drive rollers 58 as shown in FIG. 2. The rolls 58 advance the document into the document output tray 20. In this way it is possible to stream feed documents to the viewing platen 18. Each time a document on the viewing platen is advanced onto the output tray 20 a new document can be advanced from the input tray 56 onto the platen 18.

At the front of the document feeder entry tray 56 is the form feeder control panel 59 which now will be described. In order to control the form feeding operation, the pin wheel 60, as shown in detail in FIG. 3, is provided. The pin or sprocket wheel 60 includes protruding or radially extending pins 61 which mate with the edge sprocket holes in the feed hole strip 17 of the continuous form 16. The pins 61 are of small diameter so as to aid in hole tracking even though some forms may have partially blocked holes. A slot 62 is provided in the sprocket wheel 60 in correspondence to each pin 61 and the slots 62 are arranged radially inwardly of the pins 61. An optical sensor 63 senses these slots as the sprocket wheel rotates due to engagement with the perforations of the continuous web 16.

As slots 62 pass the optical sensor 63 a signal is generated which is forwarded to the control system 14 for the purpose of counting the movement of the form 16. All possible size forms or webs 16 have the same hole to hole and hole to perforation spacing. In this embodiment, the optical sensor 63 comprises an LED emitter and a photocell sensor. In accordance with the preferred embodiment, the LED is on/off energized at a high frequency so that counting the number of light pulses which pass through each slot can be used to measure the speed of the form, or to detect a jam of the form as will be described later.

The pin wheel 60 is located below the document feeder entry tray 56 at the feeder control panel 59. The pin wheel 60 is arranged for movement up or down as shown in FIG. 3 so it can be selectively placed in an operative position as shown in phantom wherein the pins 61 project through a slot T in the document feeder entry tray 56 and an inoperative position wherein the pins 61 do not protrude through the slot T as shown in solid lines.

It is a highly unique aspect of the present invention that the movement of the pin wheel between its respective operative position as shown in phantom and in its inoperative position as shown in solid lines is achieved by movement of the entry bin movable bin portion 30 from its operative position as shown in phantom to its inoperative or stored position as shown in solid lines and visa-versa. The pin wheel is supported for rotation at one end of switch actuator 64. The switch actuator 64 itself is pivotally supported for movement between the inoperative position shown in solid lines and the operative position shown in phantom (the means for pivotally supporting the lever 64 are not shown). The free end of lever 64 includes a cam surface 65 and a notch 66.

When the movable bin portion is rotated from its operative position shown in phantom to its stored position shown in solid lines the adjustable protrusion engages notch 66 which in turn lowers pin wheel 60 to its inoperative position below the surface of the entry tray 56. To operate the document feeder 10 in the continuous web feeding mode, the movable bin portion 30 is rotated outwardly by hand to its position shown in phantom. This causes the switch lever 64 to pivot in a clockwise direction to the position shown in phantom thereby raising the pin wheel to its operative position so that the pins 61 extend through the slot T in the entry tray 56 and are adapted to mate with corresponding holes in feed hole perforations 17.

The switch lever 64 is also connected to an electrical switch (not shown) which generates a signal which is forwarded to the control system when the lever 64 moves to its operative position as shown in phantom. The signal tells the control system to place the feeder 10 in the continuous form feeding mode of operation and it conditions the reproducing machine to operate in that mode. When the switch lever 64 moves to its inoperative position as shown in solid lines the signal tells the control system 14 to place the copier in the semi-automatic document feeding mode of operation and conditions the copier and the feeder to provide copying in that mode.

The pin wheel 60 is an idler wheel and is only driven when it is engaged with the holes 17 in the web 16. The switch lever 64 is biased by spring 67 toward its operative position as shown in phantom.

Accordingly, the control means 14 is responsive to the movement of the entry bin 15 movable portion 30 to its open position for automatically conditioning the feeder 10 to operate in the continuous form feeding mode of operation. When the entry bin movable portion 30 is folded again into its stored position, as shown in solid lines, the control means responsive to such movement automatically conditions the feeding means 10 to operate in its semi-automatic or other mode of feeding. The motion of the entry bin 15 movable portion 30 is sensed by the pivoting of the switch lever 64 between its respective positions and the consequent switch generated signals which indicate the position of the lever 64.

To summarize the operation of this part of the feeder, unfolding the entry bin 15 automatically places the copier 11 and document feeder 10 in the continuous form mode of operation. In this condition the pin wheel 60 moves up into the plane of the semi-automatic document feeder 10 entry tray 56. The pin wheel engages the holes in the web 16 and thereby rotates with the web through the optical sensor 63. Slots 62 provide a signal to the control system which serves to count the advance of the web 16 and control its movement so that one web section at a time is advanced to the platen 18 for copying.

Figure 10:
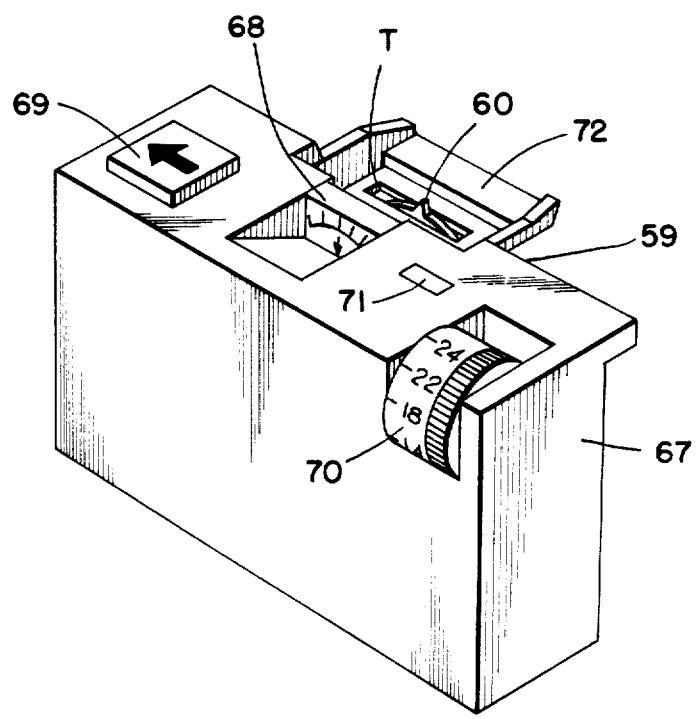
FIG. 10 is a partial perspective view showing the document feeder control panel.

Referring now to FIG. 10, further details of the control panel 59 will be described. As previously described, the control panel 59 is arranged at the front of the entry tray 56. The control panel 59 comprises a cover member 67 in which are arranged a pin wheel release button 68, a rapid form advance button 69, a feed hole dial 70 and a forms present feeding mode ready indicating light 71. The pin wheel 60 is shown protruding through the slot T in the entry tray 56.

A form guide 72 extends outwards from the control panel cover 67 and is integral therewith. The form guide 72 includes a flat member which serves to define a channel (not shown) between which the web 16 passes. The channel is defined as being between the member and the entry tray 56. The form guide 72 thereby serves to hold the edge of the web 16 against the entry tray 56 to ensure proper engagement between the pin wheel 60 and holes 17.

Figure 11:
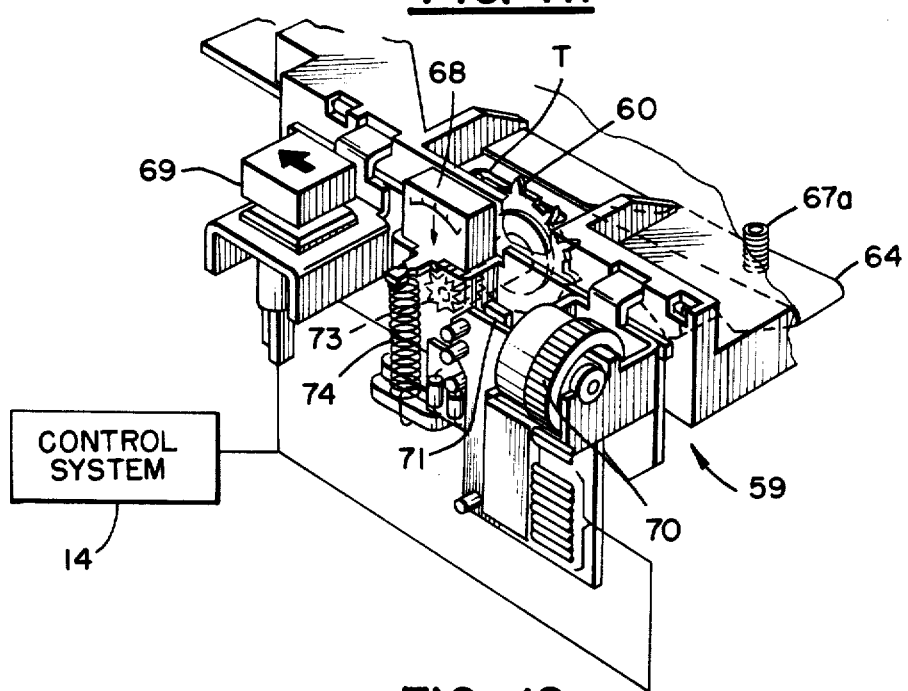
FIG. 11 is a perspective view of the document feeder control system with covers removed.

Referring now to FIG. 11, the control panel 59 is shown with the cover member 67 removed. Elements which have already been described with reference to FIG. 10 have been given corresponding reference numbers. With the cover 67 removed, relative positioning of the pin wheel 60 and switch lever 64 are clearly shown. The spring 67a biases the switch lever 64 which carries the pin wheel 61 toward its operative position as shown. The pin wheel release lever 68 pushes against sprocketed hub 73 when it is depressed. Accordingly, depressing the button 68 moves the pin wheel 60 downwardly by pivoting the switch lever 64 to its solid line position and radially locks pin wheel 60 with a pin positioned vertically for easier alignment with a hole 17. In this manner it is possible to manually move the pin wheel 60 out of the plane of the input tray 56 so that the web 16 can be easily inserted or removed from the feeder 10.

Even when the bin 15 is in its unfolded operative position, the pin wheel release button 68 is biased in its up position as shown in FIGS. 10 and 11 by means of spring 74. This enables the button to be in its normal up position irrespective of the position of the pin wheel 60 whose position is controlled by the switch lever 64.

However, when the switch lever 64 is in its operative position, as shown in phantom, depression of the button 68 causes the pin wheel 60 to depress until pressure is removed at which time the pin wheel 60 returns to its operative position. Of course, as the pin wheel 60 is depressed, the switch lever 64 is moved in a corresponding manner by the action of the button 68. When the switch lever 64 is in its operative position, the control system 14, upon conditioning the copier 11 and feeder 10 for the continuous form of mode operation, lights the indicator light 71 to indicate that the copier is in the forms feed mode of operation.

When the movable bin 30 is in its stored position so that the switch lever 64 is in a solid line position and the protusion 38 is latched in the slot 66, movement of the pin wheel release button has no effect since the pin wheel 60 and its hub 73 are already in lowered condition.

In the continuous form feeder mode of operation, the document feeder drive rollers 57 do not have the principal role in advancing the web 16 rather it is the exit drive pinch rollers 58 which serve to pull the web across the platen 18. The rollers 57 serve as a hold down to hold the web against the platen 18 and against the front reference edge G on the platen for proper tracking of the web.

The entry tray 56 includes a template 75 against which the operator places the web stack 16. The document feeder 10 can operate with various sizes of web sections, therefore, some means is necessary to allow the operator to set up the feeder 10 for different form or web section sizes. The template 75 includes indicia which provide a scale whereby the operator can determine the number of holes per web section. The operator simply lifts the top portion of the document feeder 77 and places the web stack 16 to the rear of the platen 18 and adjacent to the feed hole scale 75. The operator then reads the number of holes per web section from the scale provided. The operator then rotates the feed hole dial 70 which comprises a web section size selector switch until the number appears which is the same as the number read from the scale 75.

The feed hole dial sends a signal to the control system 14 which controls the distance the forms are advanced by the rolls 58. When the web 16 is to be advanced, the control system 14 reads the form size selector switch 70 and advances the web based upon the number of holes per web section selected by the operator. The control sequence will be described in further detail later. However, the arrangement permits each web section to be advanced over the platen or viewing glass 18 in proper registration therewith.

The number of holes is equivalent to a measure of web section size since all webs regardless of actual panel size have the same hole spacing.

Figure 13:
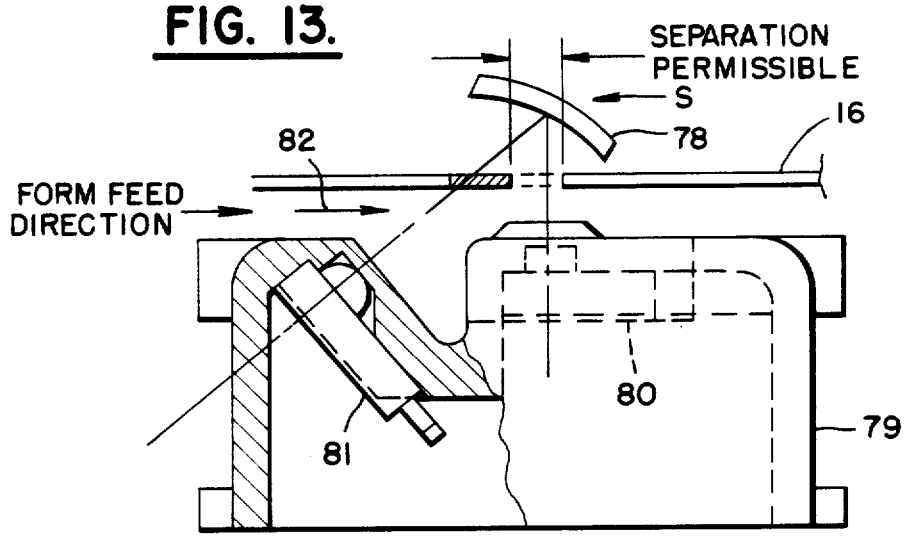
FIG. 13 is a partial cross-sectional view of a forms present sensor in accordance with the present invention.

Referring now to FIGS. 3 and 13, the document feeder 10 of this invention includes a forms present sensor S located in the entry tray 56. The sensor S in this embodiment is a reflective optical sensor which is adapted to signal the control system 14 to continue operation of the feeder 10 so long as forms are present. When the trailing end of the web passes the sensor, the sensor indicates that a form is no longer present, however, one or possibly two sections of the web remain to be copied depending on web section size. However, these last sections are disengaged from the pin wheel 60. It is therefore necessary for the control system 14 to move these last web sections in a manner which will be described hereafter so that they can be properly registered on the document glass 18 for copying. The forms present sensor S is a reflective sensor arranged such that a reflector 78 is above the sensor housing 79. The reflector 78 is supported by the control panel 59 from guide 72. Contamination is eliminated by using a housing 79 material which is transparent to infrared radiation. The housing therefore does not require apertures or openings which could collect dust.

The sensor S comprises a light emitting diode (LED) 80 and a photosensor 81 both supported by the housing 79. The light beam which originates from the LED 80 is reflected back to the sensor 81 by the reflector 78. The light beam is oriented such that the plane of the beam is parallel to the feed direction and perpendicular to the plane of the web 16. Invalid light paths that would normally travel from the LED 80 to the photo sensor 81 are blocked by covering portions of the LED with opaque coating material.

When the web is present between the mirror 78 and the sensor S, the light path between the LED 80 and the sensor 81 is blocked. If the web sections are separated at a perforation, it has to be a relatively large separation before any light will reach the sensor 81. A large tear in the web 16 will open the light path between the LED 80 and the sensor 81 causing a signal to be forwarded to the control system 14 to detect the end of forms condition. If the sensor 81 again detects paper being present by blockage of the beam of the LED 80 before the feeding operation stops, then the control system 14 realizes that it was a tear rather than the actual end of the web. In this case, the feeding operation would be stopped with the control system 14 providing an indication that the feeder needed to be checked.

The multipurpose document feeder 10 which has been described can be used as an accessory on to an existing copier such as an IBM Series III Model 60 copier. The entry tray of the Model 60 copier is replaced with the new entry tray 56 in accordance with this invention having the control panel 59 and pin wheel 60.

To load a web 16 into the feeder 10, the top portion of the feeder 77 is pivoted away from the viewing platen 18. The web is then fed over the entry tray 56 until the first web section to be copied is properly registered on the glass 18. In order to permit the web to be so placed, the button which depresses the sprocket wheel 68 is depressed to lower the sprocket wheel so the form can be advanced over the input tray and viewing platen 18. After it is properly registered, the button is raised so that the pin wheel 60 engages the holes 17 in the web. At this point the document feeder portion 77 is lowered so that the pinch wheels 58 drivingly engage the web. Of course, prior to inserting the web in the tray 56, the entry bin 15 and the exit bin 19 are put in their respective operative arrangements.

Figure 14:
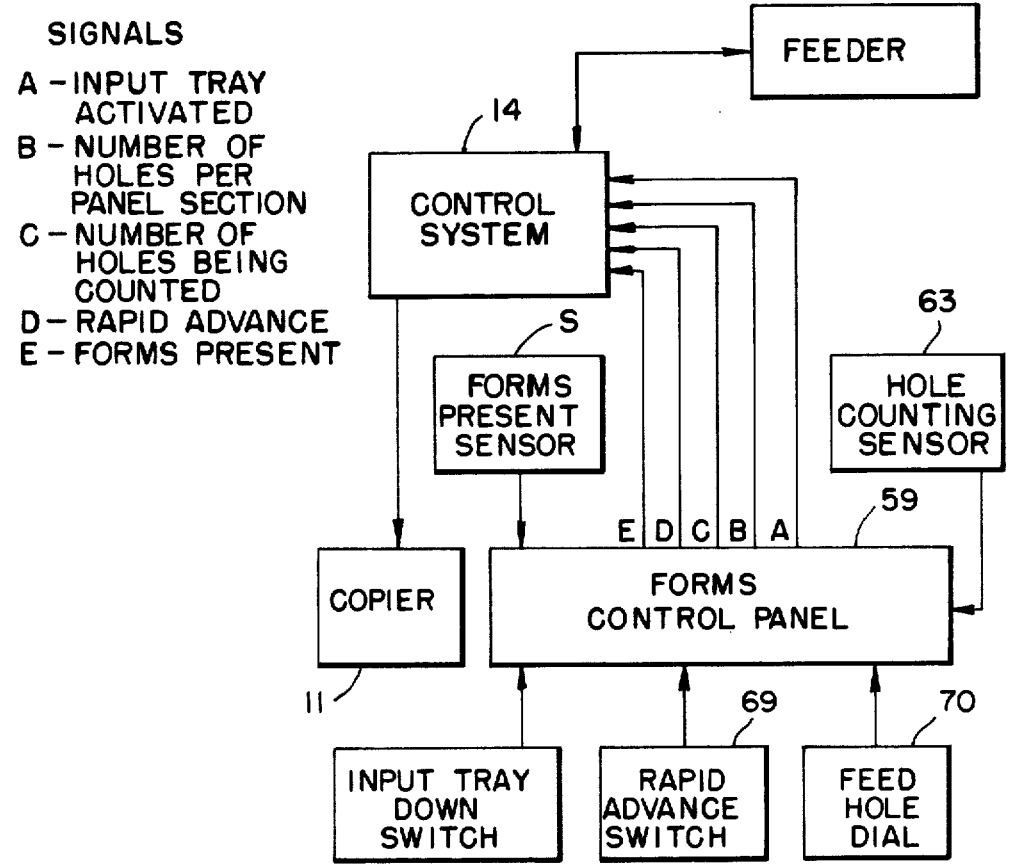
FIG. 14 is a block diagram of the reproducing machine and multipurpose document feeder control system in accordance with this invention.

Having thus described the continuous web feeder mechanism in some detail, reference will now be made to FIG. 14 in order to illustrate the control functions provided by the control system and the general operation of the feeder. The circuitry which provides the control functions of the control system 14 will not be described and can comprise any desired conventional form of digital or analog circuitry. The specific details of the circuitry does not form part of the invention herein. However, the functions provided by the control system are believed to be highly unique.

Initiation of the continuous web mode of operation is achieved by rotating the movable bin portion 30 of the input bin 15 to its outward operative position. As a result of this movement, the switch lever 64 moves to its operative position as shown in phantom in FIG. 3. A switch (not shown) actuated by the switch lever 64 generates a signal A which is inputted to the control system when the switch lever 64 is its operative position. Signal A tells the control system that the continuous form feeding mode of operation is desired. When the switch lever 64 is in its solid line inoperative position, signal A tells the control system 14 that the semi automatic or other document feeding mode of operation is desired.

In conjunction with signal A, if a form is inserted onto the pin wheel the forms present sensor S senses the forms and generates signals A and E indicating that the web feeding mode of operation is desired if the copier 11 has a collator 13 the control system 14 selects automatically the collating mode of operation. The control system 14 also inhibits the job interrupt function. The document feeder 10 as described can operate in either the semi-automatic document feeding or the continuous form feeding modes. Selection of the continuous feeding mode as indicated by signal A causes the control system 14 to automatically inhibit the other document feeding mode of operation.

Figure 12:
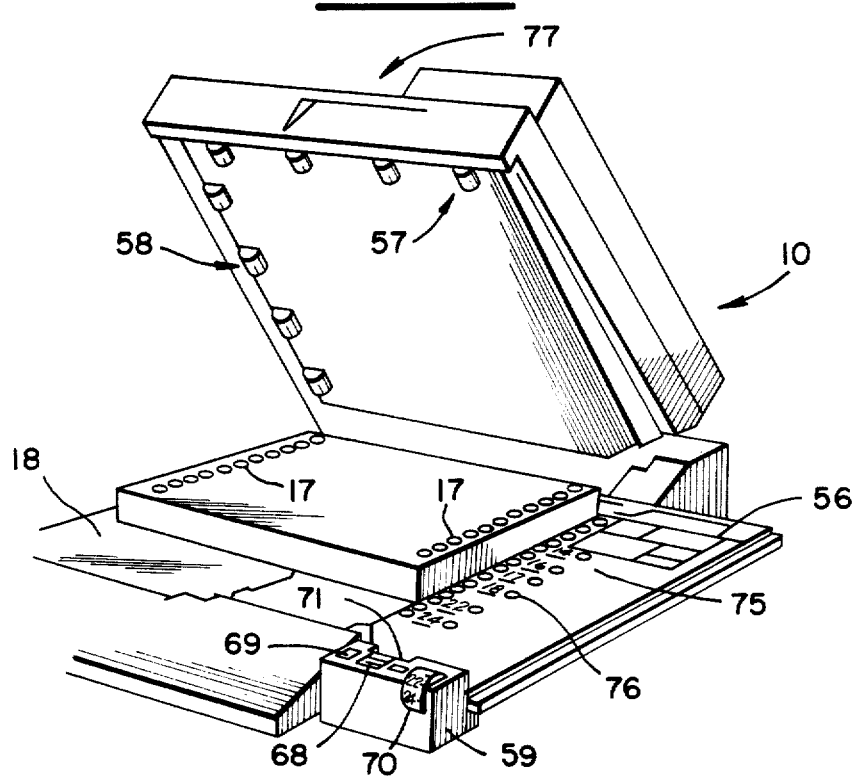
FIG. 12 is a partial perspective view showing the interrelationship between the feed hole scale and the feed hole dial.

After the operator initiates the continuous form mode of operation by opening the entry bin 15, he places the web stack 16 on the document glass 18 as in FIG. 12 to determine the number of holes per web section or form. The operator then sets the form size dial 70 to the appropriate number of holes. The dial 70 provides a signal B to the control system 14 which indicates the size comprising the number of holes of the web section which is to be fed incrementally by the feeder. If the size is smaller than the size of the paper in the copier's paper supply drawer which is sensed by a switch (not shown), then the copier's interimage erase station (not shown) is controlled to erase any undesired images, such as black borders or subsequent form information so that the smaller form or web section size is copied without unwanted details. The activation of the copier erase system and the amount of the erasure which is taken is controlled by the control system 14 by comparing the setting of the form selector wheel 70 to the sensed size of the paper in the copier.

Having thus initiated the continuous form mode of operation and having placed the web with the initial web section to be copied properly registered on the viewing platen 18 with the leading panel being engaged by the rolls 58, the web section is copied any desired number of times to provide a desired number of copies. Thereafter, the web 16 is advanced by rolls 58 under the direction of the control system 14. The slots 62 taken with the sensor 63 comprise an encoder which provides a signal C to the control system for the purpose of counting the holes in the web section with each slot corresponding to a hole. The desired number of holes has already been set by the dial 70 via signal B. The control system 14 counts the proper number of holes via signal C, namely the number of holes corresponding to one panel section as set by the dial 70. This is accomplished by comparing signal C to signal B. At this point the web must be stopped. The web 16 must be stopped, however, such that it is registered properly with respect to the viewing platen 18. This can be accomplished regardless of machine to machine tolerance variations.

As the web is being advanced, an electrical signal C from the encoder is received by the control system 14 corresponding to each hole in the web section. A counter in the control system is advanced each time a hole has passed and when the next to the last hole is counted, the control system waits for a defined period of time before the web movement is stopped. The defined period of time is set by the factory or by a customer service representative when the feeder unit is installed on the copier 11. In summary, when the last hole of the web section, for example, a hole indicating that a preceding web section is about at the registration point on the platen 18, is detected, a timer is activated to continue paper movement for a preselected interval or defined period of time. This defined period of time is preset as previously noted for each individual copier.

The pin wheel 60 located on the feeder bin entry tray 56 is driven by the web as it advances for copying. The encoder comprises the pin wheel slot 62 and sensor 63. The sensor comprises an LED on one side of the wheel 60 radially positioned to direct a beam of light through the slot 62 and a corresponding photodetector on the other side of the wheel 60 is radially positioned to receive the beam transmitted through the slots.

During the web feeding operation, the LED and the sensor 63 are pulsed at a known high frequency causing a string of pulses to be put out by the sensor as signal C to the control system 14. When a pin wheel 60 slot 62 opens the light path, the number of pulses which get through the rotating wheel 60 correlates with the speed of the web as the slot 62 moves past the sensor 63. To qualify as a slot 62 a minimum number of pulses is required to eliminate false detection of slots 62 because of electrical noise. The control system 14 expects to receive a signal C corresponding to some maximum number of pulses per slot 62. If this number is exceeded, the control system 14 assumes that a jam has occurred and the pin wheel 60 has stopped with a slot between the LED and the photodetector. A suitable jam signal would be displayed on the control panel 14 by the control system.

Similarly, a maximum time between slots 62 cannot be exceeded or the control system 14 will assume that the pin wheel 60 has stopped with the wheel 60 blocking the light path. Again, the feeding of the web would end and a suitable jam message would be displayed at the control panel.

In normal operation, after the required number of holes has been sensed, and the web section feeding operation terminates in accordance with the use of a preset defined period of time technique as previously described, the desired number of copies is then made of the web section. The control system 14 then repeats the feeding sequence for each additional web section for which copying is desired. The control system 14 repeats the sequential feeding by utilizing the encoder slots 62, sensor 63 and its control logic to control the feeding of each web section.

The control system includes circuitry which counts the first few web sections of the web to be copied. For example, the first two or three web sections the control system 14 stops the feeder to allow the operator to check the exit bin 19 to ensure that the web is folding properly after copying. If it is not, the operator can take the opportunity to properly fold the web sections and then restart the copier at which time the copier will continue the sequential operation previously described.

The output bin 19 has been designed to properly stack a plurality of web section sizes. However, in order to get the stacks started properly, operator intervention is sometimes required. The aforenoted function of the control system enables this intervention. To restart the copying operation, the operator pushes the start button again and the copier and feeder resume operation until the end of the web.

Referring again to FIGS. 11, 12 and 14, selected panels of a continuous web 16 may be copied by the use of a rapid advance button 69. The rapid advance button 69 causes a signal D to be sent to the control system 14 so that the document feeder 10 advances the web at a substantially faster speed than the normal speed of advancement such as twice the normal rate. This rapid advance is continued as long as the button 69 is held depressed. When the operator releases the button after a desired web section or panel arrives at the viewing platen 18 for copying, the control system returns to its normal operation. The start button is now depressed to cause that web section or panel to be copied. The web thereafter advances one web section at a time for copying until the operator again pushes the rapid advance button whereupon advancing and copying stops. When the operator again pushes the rapid advance button 69, the control system 14 again advances the form at the rapid rate without copying each web section. The operator may use the rapid advance button 69 and the control function initiated thereby after first loading the web 16 in the feeder 10. This permits the advance to a first web section desired to be copied which can be somewhere in the middle of the web stack.

When the forms present sensor S indicates that the end of the web has arrived, a signal E is sent to the control system 14 which causes the control system to interrupt copying. The control system then indicates in a visual display (not shown) that alignment of the last web section which is now on the viewing platen 18 must be checked for proper registration before copying. The document feeder cover 77 must be raised and this condition sensed by the control system in order to enable the start button. The cover 77 is then closed to begin copying of the last panels. This is a preferred feature in accordance with this invention and can be disabled for those installations where it is known that the web 16 includes trailer web sections that are blank. When the forms present sensor S indicates that the last web section has arrived at the entry tray 56, then the control system provides a calculated predetermined time duration based upon a prior panel section length to feed the last one or two web sections. This is necessary since the pin wheel 60, which normally controls the document feeding interval for proper registration, is disengaged from the web when only one or two panels remain to be copied.

The geometry of the continuous web feeder of this invention is such the last one or two web sections or forms cannot be tracked by the pin wheel as previously noted. Previously described control functions allow these last sections to be properly registered. This can be accomplished by utilizing a free running oscillator (not shown) which creates timing pulses of a fixed duration and period in the control system 14. Each time a web section is fed over pin wheel 60 a counter in the control system 14 stores the number of timing pulses which occur during the feed. At the end of the feed, providing the feed terminates normally without a jam, the number accumulated in the counter of the control system is stored in a register (not shown) referred to as a last feed register. The abovedescribed counter again counts the number of timing pulses which occur during the next feed. At the end of this feed, provided the feed terminates normally, the contents of the last feed register are transferred to a register (not shown). This is referred to as the next-to-last feed register. The number accumulated in the counter is stored in the last feed register. The above described sequence continues until the end of forms condition is sensed by sensor S and the signal arrives at control system 14 as signal E. When the end of forms condition indicated by signal E occurs, the control system 14 then feeds the web the same length of time as the second previous form or web section was fed. At the end of this timed feed, the contents of the two registers are swapped and the next feed, also a timed feed, is fed for the same length of time as the second previous web section.

It is known that the time to feed a continuous form will vary between alternating web sections or panels due to the forms stacking geometry. By employing two registers, the time controlled feeds will more clearly approximate the actual times needed to feed the last panels of the web 16. This storage procedure in the control system 14 permits changes in feeding velocity from one machine to another and even within a machine.

Since it is known that the last sheets of the web have less drag than previous sheets, observations have been made and data have been collected to determine last sheet modifiers. These modifiers have been included in the control logic of control system 14 to alter the timed feed such that they actually shorten the feeding times compared to their respective controlled feeds. This provides even more accurate registration of the web sections on the platen 18.

The control system 14 is also utilized when the copier 11 is running in the other document feeding mode(s) of operation. The continuous mode of operation can be inhibited so that it is not permitted to be activated if the copier 11 includes a reduction mode. In this manner the operator has freedom to select it only when desired.

The patents referred to in the background of the application are intended to be incorporated by reference herein.

While the invention has been particularly shown and described with reference to a preferred embodiment thereof it will be understood by those skilled in the art that the foregoing and other changes in form and details may be made therein without departing from the spirit and scope of the invention.

What is claimed is:

1. A multipurpose document feeder for a reproducing machine including means for viewing a document and for forming an image thereof on a desired copy substrate, said document feeder comprising:
   document feeding means selectively operable in a first mode wherein one or more individual document sheets are serially fed to said viewing means or in a second mode wherein said document comprises a continuous web which is incrementally advanced over said viewing means;
   continuous web supporting means arranged adjacent said document feeding means for supporting a fan-folded stack of said web;
   means for supporting said web supporting means for movement selectively between a first stored position, corresponding to said first mode, wherein it does not interfere with operation of said feeding means in said first mode of operation and a second operative position, corresponding to said second mode, wherein it is operative to support said web for feeding by said feeding means to said viewing means in said second mode of operation; and
   control means responsive to the movement of said web supporting means between its respective first and second positions for automatically conditioning said feeding means to operate in its corresponding first or second mode of operation.

2. A multipurpose document feeder for a reproducing machine including means for viewing a document and for forming an image thereof on a desired copy substrate, said document feeder comprising:
   document feeding means selectively operable in a first mode wherein one or more individual documents sheets are serially fed to said viewing means or in a second mode wherein said document comprises a continuous web which is incrementally advanced over said viewing means, said continuous web being divided into a plurality of web sections and said web including spaced apart holes extending longitudinally along at least one edge thereof;
   continuous web supporting means arranged adjacent said document feeding means for supporting a fan folded stack of said web;
   means for supporting said web supporting means for movement selectively between a first start position, corresponding to said first mode, wherein it does not interfere with operation of said feeding means in said first mode of operation and a second operative position, corresponding to said second mode, wherein it is operative to support said web for feeding by said feeding means to said viewing means in said second mode of operation; and
   control means responsive to the movement of said web supporting means between its respective first and second positions for automatically conditioning said feeding means to operate in its corresponding first or second mode of operation;
   said feeding means further including:
   a pin wheel arranged for rotation, said pin wheel having a plurality of pins extending radially outwardly therefrom, the spacing of said pins being selected so that said pins can meet with said holes of said web;
   means for supporting said pin wheel selectively in a first stored position wherein it will not intercept a web or a sheet at said feeding means or in a second operative position wherein at least one of said pins mates with at least one of said web holes so that movement of said web causes a corresponding movement of said pin wheel; and
   means for positioning said pin wheel in its first position responsive to said web supporting means being moved to its first position and for positioning said pin wheel in its second position responsive to said web supporting means being moved to its second position.

3. A feeder as in claim 2 further including:
   override means manually operative to move said pin wheel from its second position to its first position so as to facilitate insertion or removal of said web in said feeding means.

4. A feeder as in claim 2 wherein said web supporting means comprises an input basket comprising first stationary portion and a second movable portion hinged to said first portion, said movable portion being movable between said first stored position and said second operative position and sensing means for sensing the position of said movable bin portion, said sensing means being connected to said control means for indicating the position of said movable bin portion.

5. A feeder as in claim 2 wherein an output basket is provided with means for receiving said web after it exits said feeding means, and wherein said feeding means includes an output receiving tray for receiving said documents when said feeding means is operated in its first mode, and wherein said output basket is removably arranged to seat in said output receiving tray when said feeding means is operated in its second mode of operation.

6. A feeder as in claim 5 wherein said output basket comprises a first portion for directing said web upwardly, a second portion following said first portion for directing said web downwardly and a third portion comprising a receiving tray inclined to the horizontal following said second portion, each of said first, second and third portions being connected together.

7. A feeder as in claim 6 wherein said web supporting means comprises an input basket comprising a first stationary portion and a second movable portion hinged to said first portion, said movable portion being movable between said first stored position and said second operative position and sensing means for sensing the position of said movable bin portion, said sensing means being connected to said control means for indicating the position of said movable bin portion.

8. A feeder as in claim 2 wherein said control means includes:
   encoder means associated with said pin wheel for generating a first control signal corresponding to the degree of movement of said pin wheel;
   manual selector means having a plurality of settings for generating a second control signal corresponding to a desired incremental web feeding length; and
   means for comparing said first and second signals for controlling the incremental feeding length of said web by said feeding means in said second mode of operation.

9. A feeder as in claim 8 wherein each web section has a length corresponding to said desired incremental web feeding length, said feeder further comprising:
   a measuring member having indicia corresponding to a plurality of different web section lengths, said measuring member being arranged adjacent said feeding means, said indicia further corresponding to appropriate manual selector means settings;
   whereby when said web is positioned on said measuring member, the appropriate setting of said selector means can be determined.

10. A feeder as in claim 8 wherein said control means comprises means including said pin wheel and said encoder means for sensing a web jam in said feeding means.

11. A feeder as in claim 10 wherein said control means comprises means including said pin wheel and said encoder means for sensing a tear in said web.

12. A feeder as in claim 8 wherein said encoder means generates said first signal comprising a plurality of pulses with each pulse corresponding to a given fraction of said desired incremental feeding length and wherein said comparing means includes means for counting said pulses and for comparing the number of pulses counted to a desired number set by said selector means and means for generating a third signal when the desired number of pulses is counted for controlling said feeding means to stop said web with a desired web section over said viewing means.

13. A feeder as in claim 12 wherein said control means includes means responsive to said viewing means completing the viewing and imaging of said desired web section for initiating said feeding means to feed the next web section to said viewing means.

14. A feeder as in claim 8 wherein said control means includes:
   means for sensing an upstream end of said web;
   means responsive to said end sensing means for interrupting said feeding means for a desired time with at least one desired incremental web length remaining to be fed over said viewing means; and
   means operative following said desired time for causing said feeding means to feed said web for a predetermined period of time to feed said at least one remaining web section to said viewing means even if said pin wheel is no longer operatively engaged to said web.

15. A feeder as in claim 14 wherein said means for causing said web feeding for a predetermined time is operative to provide a plurality of such feeding sequences corresponding to the number of incremental web lengths remaining to be viewed when said feeding means is interrupted with each such incremental web feed being initiated following completion of the viewing and imaging of the preceding web section.

16. A feeder as in claim 15 wherein said desired feeding means interrupt time comprises the time necessary for an operator to check the web in the feeder to insure it is properly registered relative to said viewing means.

17. A feeder as in claim 16 wherein said feeding means includes a cover portion arranged for movement toward or away from said viewing means between respective closed or open positions and wherein said cover portion must be moved to its open position to check web registration and wherein said means for feeding said web a predetermined period of time is operative responsive to the movement of the cover portion to its closed position after the web is checked for proper registration.

18. A feeder as in claim 8 wherein said control means comprises:
   means including said pin wheel and said encoder for sensing the feeding of a given number incremental web feeds;
   means responsive to the sensing of said given number of incremental web feeds for interrupting the feeding of said web by said feeding means to permit the proper restacking of the web exiting the feeding means; and
   means for restarting said feeding means after said interruption.

19. A feeder as in claim 2 wherein said control means includes means for selectively operating said feeder to rapidly advance said web to position a desired web section over said viewing means.

20. A feeder as in claim 8 wherein said pin wheel comprises an optical beam splitter and wherein said encoding means comprises beam generating means arranged adjacent one side of said pin wheel and beam sensing means arranged adjacent an opposing side of said pin wheel.

21. A feeder as in claim 2 wherein responsive to movement of said web supporting means to its second position, said control system inhibits said feeding means from operating in its first mode of operation.

22. A multipurpose copier comprising:
means for viewing a document and for forming an image thereof on a desired copy substrate, means for selectively collecting said imaged substrates, said output collecting means comprising: an output tray for receiving said imaged substrates from said viewing and image forming means, and a collator for collecting said image substrates received from said viewing and image forming means, and means for selectively collecting said image substrates in said output tray or in said collator respectively, said copier further comprising document feeding means for feeding documents to said viewing means and control means for controlling the operation of said respective viewing and imaging means, said output collecting means and said document feeding means;
said control means operating said document feeding means selectively in a first mode wherein one or more individual document sheets are serially fed to said viewing means or in a second mode wherein said document comprises a continuous web which is incrementally advanced over said viewing means;
said copier means further comprising:
continuous web supporting means arranged adjacent said document feeding means for supporting a fanfolded stack of said web;
means for supporting said web supporting means for movement selectively between a first stored position, corresponding to said first mode, wherein it does not interfere with operation of said feeding means in said first mode of operation, and a second operative position, corresponding to said second mode, wherein it is operative to support said web for feeding by said feeding means to said viewing means in said second mode of operation; and
said control means being responsive to the movement of said web supporting means between its respective first and second positions for automatically conditioning said feeding means to operate in its corresponding first or second mode of operation.

23. A multi-purpose copier comprising:
means for viewing a document and for forming an image thereof on a desired copy substrate,
output collecting means comprising:
an output tray for receiving said image substrates from said viewing and image forming means,
a collator for collecting said image substrates received from said viewing and image forming means,
means for selectively collecting said imaged substrates in said output tray or in said collator, respectively,
document feeding means for feeding documents to said viewing means and control means for controlling the operation of said respective viewing and imaging means, said output collecting means and said document feeding means;
said control means operating said document feeding means selectively in a first mode wherein one or more individual document sheets are serially fed to said viewing means or in a second mode wherein said document comprises a continuous web which is incrementally advanced over said viewing means, said continuous web being divided into a plurality of web sections and said web including spaced apart holes extending longitudinally along at least one edge thereof;
said copier means further comprising:
continuous web supporting means arranged adjacent said document feeding means for supporting a fan folded stack of said web;
means for supporting said web supporting means for movement selectively between a first start position, corresponding to said first mode, wherein it does not interfere with operation of said feeding means in said first mode of operation, and a second operative position, corresponding to said second mode, wherein it is operative to support said web for feeding by said feeding means to said viewing means in said second mode of operation; and
said control means being responsive to the movement of said web supporting means between its respective first and second positions for automatically conditioning said feeding means to operate in its corresponding first or second mode of operation;
said feeding means further including:
a pin wheel arranged for rotation, said pin wheel having a plurality of pins extending radially outwardly therefrom, the spacing of said pins being selected so that said pins can mate with said holes of said web;
means for supporting said pin wheel selectively in a first stored position wherein it will not intercept a web or a sheet at said feeding means or in a second operative position wherein at least one of said pins mates with at least one of said web holes so that movement of said web causes a corresponding movement of said pin wheel; and
means for positioning said pin wheel in its first position responsive to said web supporting means being moved to its first position for positioning said pin wheel in its second position responsive to said web supporting means being moved to its second position.

24. A copier as in claim 23 further including:
override means manually operative to move said pin wheel from its second position to its first position so as to facilitate insertion or removal of said web in said feeding means.

25. A copier as in claim 23 wherein said web supporting means comprises an input basket comprising a first stationary portion and a second movable portion hinged to said first portion said movable portion being movable between said first stored position and said second operative position and sensing means for sensing the position of said movable bin portion, said sensing means being connected to said control means for indicating the position of said movable bin portion.

26. A copier as in claim 23 wherein an output basket is provided for receiving said web after it exits said feeding means, and wherein said feeding means includes an output receiving tray for receiving said documents when said feeding means is operated in its first mode, and wherein said output basket is removably arranged to seat in said output receiving tray when said feeding means is operated in its second mode of operation.

27. A copier as in claim 26 wherein said output basket comprises a first portion for directing said web upwardly, a second portion following said first portion for directing said web downwardly and a third portion comprising a receiving tray inclined to the horizontal following said portion, each of said first, second and third portions being connected together.

28. A copier as in claim 27 wherein said web supporting means comprises an input basket comprising a first stationary portion and a second movable portion hinged to said first portion, said movable portion being movable between said first stored position and said second operative position and sensing means for sensing the position of said movable bin portion, said sensing means being connected to said control means for indicating the position of said movable bin portion.

29. A copier as in claim 23 wherein said control means includes:
   encoder means associated with said pin wheel for generating a first control signal corresponding to the degree of movement of said pin wheel;
   manual selector means having a plurality of settings for generating a second control signal corresponding to a desired incremental web feeding length; and
   means for comparing said first and second signals for controlling the incremental feeding length of said web by said feeding means in said second mode of operation.

30. A copier as in claim 29 wherein each web section has a length corresponding to said desired incremental web feeding length, said feeder further comprising:
   a measuring member having indicia corresponding to a plurality of different web section lengths, said measuring member being arranged adjacent said feeding means, said indicia further corresponding to appropriate manual selector means settings;
   whereby when said web is positioned on said measuring member, the appropriate setting of said selector means can be determined.

31. A copier as in claim 29 wherein said control means comprises means including said pin wheel and said encoder means for sensing a web jam in said feeding means.

32. A copier as in claim 31 wherein said control means comprises means including said pin wheel and said encoder means for sensing a tear in said web.

33. A copier as in claim 29 wherein said encoder means generates said first signal comprising a plurality of pulses with each pulse corresponding to a given fraction of said desired incremental feeding length and wherein said comparing means includes means for counting said pulses and for comparing the number of pulses counted to a desired number set by said selector means and means for generating a third signal when the desired number of pulses is counted for controlling said feeding means to stop said web with a desired web section over said viewing means.

34. A copier as in claim 33 wherein said control means includes means responsive to said viewing means completing the viewing and imaging of said desired web section for initiating said feeding means to feed the next web section to said viewing means.

35. A copier as in claim 29 wherein said control means includes:
   means for sensing an upstream end of said web;
   means responsive to said end sensing means for interrupting said feeding means for a desired time with at least one desired incremental web length remaining to be fed over said viewing means;
   means operative following said desired time for causing said feeding means to feed said web for a predetermined period of time to feed said at least one remaining web section to said viewing means even if said pin wheel is no longer operatively engaged to said web.

36. A copier as in claim 35 wherein said means for causing said web feeding for a predetermined time is operative to provide a plurality of such feeding sequences corresponding to the number of incremental web lengths remaining to be viewed when said feeding means is interrupted with each such incremental web feed being initiated following completion of the viewing and imaging of the preceding web section.

37. A copier as in claim 36 wherein said desired feeding means interrupt time comprises the time necessary for an operator to check the web in the feeder to insure it is properly registered relative to said viewing means.

38. A copier as in claim 37 wherein said feeding means includes a cover portion arranged for movement toward or away from said viewing means between respective closed or open positions and wherein said cover portion must be moved to its open position to check web registration and wherein said means for feeding said web a predetermined period of time is operative responsive to the movement of the cover portion to its closed position after the web is checked for proper registration.

39. A copier as in claim 29 wherein said control means comprises:
   means including said pin wheel and said encoder for sensing the feeding of a given number incremental web feeds;
   and means responsive to the sensing of said given number of incremental web feeds for interrupting the feeding of said web by said feeding means to permit the proper restacking of the web exiting the feeding means; and
   means for restarting said feeding means after said interruption.

40. A copier as in claim 29 wherein said control means includes means for selectively operating said feeder to rapidly advance said web to position a desired web section over said viewing means.

41. A copier as in claim 29 wherein said pin wheel comprises an optical beam splitter and wherein said encoding means comprises beam generating means arranged adjacent one side of said pin wheel and beam sensing means arranged adjacent an opposing side of said pin wheel.

42. A copier as in claim 23 wherein responsive to movement of said web supporting means to its second position said control means inhibits said feeding means is from operating in its first mode of operation.

43. A copier as in claim 23 wherein said control means is adapted to operate said copier in a non-collating mode wherein said imaged sheets are collected in said imaged sheet output tray or in a collating mode wherein said imaged sheets are collated in said collator and wherein responsive to the movement of said web supporting means to its second position said control means operates said copier in said collating mode.

44. A copier as in claim 23 wherein said control means includes a job interrupt mode of operation for completing a copier run after a run interruption and wherein responsive to the movement of said web supporting means to its second position said job interrupt mode of operation is inhibited.

45. A process for operating a multipurpose copier comprising:

viewing a document for forming an image thereof on a desired copy substrate;

selectively collecting said image substrates in an upper tray or a collator, respectively;

feeding documents to said viewing means; and controlling said respective steps of viewing and imaging, collecting and document feeding comprising:

selectively controlling said document feeding in a first mode wherein one or more individual document sheets are serially fed to be viewed in a second mode wherein said document comprises a continuous web which is incrementally advanced to be viewed;

providing a continuous web supporting means for supporting a fan-folded stack of said web for feeding to be viewed;

supporting said web supporting means for movement selectively between a first stored position corresponding to said first mode and a second operative position corresponding to said second mode; and responsive to the movement of said web supporting means between its respective first and second positions automatically conditioning said copier to feed said document to be viewed in a corresponding first or second mode of operation.

46. A process as in claim 45 comprising:

generating a first control signal corresponding to the degree of movement of said web;

generating a second control signal corresponding to a desired incremental web feeding length; and comparing said first and second signals for controlling the incremental feeding length of said web during said feeding step in said second mode of operation.

47. A process as in claim 46 comprising sensing a web jam during feeding, said web jam sensing step comprising comparing said first control signal to a desired signal to determine whether a web jam has occurred.

48. A process as in claim 46 comprising sensing a tear in said web by comparing said first control signal to a predetermined signal.

49. A process as in claim 46 wherein said first control signal comprises a plurality of pulses with each pulse corresponding to a given fraction of a desired incremental feeding length and wherein said comparing step comprises counting said pulses and comparing the number of pulses counted to a predetermined number and generating a third signal when the desired number pulses is counted for controlling the feeding step to stop said web with a desired web section to be viewed.

50. A process as in claim 46 wherein said controlling step initiates said feeding step to feed the next web section to be viewed responsive to the viewing step completing the viewing and imaging of a previous web section.

51. A process as in claim 46 comprising:

sensing an upstream end of said web;

responsive to sensing said upstream end interrupting said feeding step for a desired time with at least one desired incremental web length remaining to be fed to be viewed; and following said desired time causing said web to be fed for a previously predetermined period of time to feed said at least one remaining web section to be viewed.

52. A process as in claim 46 comprising sensing the feeding of a given number of incremental web feeds and responsive to the sensing of said given number of web feeds interrupting the feeding of said web to permit proper restacking of the web and restarting the feeding of the web after the interrupting.

53. A process as in claim 46 wherein said feeding comprises said second mode of operation and wherein said first mode of operation is inhibited.

54. A process as in claim 46 wherein responsive to the feeding of said web in said second mode of operation said controlling step includes the step of operating said copier in a collating mode of operation.

55. A process as in claim 46 wherein responsive to the feeding of said web in said second mode of operation a job interrupt mode of operation of said copier is inhibited.

* * * * *

UNITED STATES PATENT AND TRADEMARK OFFICE
CERTIFICATE OF CORRECTION

PATENT NO. : 4,714,946

DATED : December 22, 1987

INVENTOR(S) : Bajgert et al.

It is certified that error appears in the above—identified patent and that said Letters Patent is hereby corrected as shown below:

<u>IN THE IDENTIFICATION OF THE INVENTORS</u>:

The following are also inventors: --Jimmy D. Stone, Longmont; Thomas T. Underhill, Boulder; David M. Williams, Boulder and Clement C. Wilson, Boulder, all of Colo.--.

Signed and Sealed this

Twenty-first Day of June, 1988

Attest:

DONALD J. QUIGG

*Attesting Officer*           *Commissioner of Patents and Trademarks*